United States Patent [19]

Su

[11] Patent Number: 5,440,904
[45] Date of Patent: Aug. 15, 1995

[54] CABLE LOCK ASSEMBLY FOR BICYCLES

[76] Inventor: Shun-Chang Su, No. 11, Pin Ho Road, Ru Gang Cheng, Chang Hua Hsien, Taiwan

[21] Appl. No.: 265,746

[22] Filed: Jun. 27, 1994

[51] Int. Cl.⁶ .................................................. E05B 71/00
[52] U.S. Cl. .......................................... 70/18; 70/49; 70/58; 70/233
[58] Field of Search .................. 70/38 A, 39, 51, 18, 70/233, 234, 30, 49, 58

[56] References Cited

U.S. PATENT DOCUMENTS

| 587,703 | 8/1897 | Chase | 70/30 |
|---|---|---|---|
| 4,112,716 | 9/1978 | Wippich | 70/49 X |
| 5,009,087 | 4/1991 | Long | 70/51 X |

FOREIGN PATENT DOCUMENTS

| 617978 | 2/1949 | United Kingdom | 70/49 |
|---|---|---|---|
| 2240578 | 8/1991 | United Kingdom | 70/49 |
| WO90/02074 | 3/1990 | WIPO | 70/233 |

*Primary Examiner*—Lloyd A. Gall
*Attorney, Agent, or Firm*—Charles E. Baxley

[57] ABSTRACT

A lock includes a shackle for locking a wheeled cycle and includes a cable for locking the wheeled cycle to another object. Two catches are slidably engaged in the lock and each has a knob extended outward beyond the lock, the catches may engage with the ends of the cable so as to retain the ends within the lock. Two pins are slidably engaged in the block and are forced toward the catches to engage with the catches so as to lock the catches in place when the shackle is engaged in the lock.

1 Claim, 3 Drawing Sheets

CABLE LOCK ASSEMBLY FOR BICYCLES

BACKGROUND OF THE INVENTION

1. Field of the Invention

The present invention relates to a lock, and more particularly to a lock assembly for locking wheeled cycles.

2. Description of the Prior Art

Typical locks for locking bicycles comprise a shackle for engaging with bicycles. However, the locks may lock the bicycles themselves only and may not lock the bicycles to other objects.

The present invention has arisen to mitigate and/or obviate the afore-described disadvantages of the conventional locks for locking bicycles.

SUMMARY OF THE INVENTION

The primary objective of the present invention is to provide a lock assembly which may lock the bicycle itself and may lock the bicycle to other object.

In accordance with one aspect of the invention, there is provided a lock assembly comprising a block including two holes and two rooms formed therein, two apertures formed in the block and communicated with the rooms, a shackle for engaging with the holes of the block and including two cavities formed therein, a pair of latches slidably disposed in the block, means for biasing the latches to engage with the cavities of the shackle so as to lock the shackle in the holes, a cable including two ends for engaging with the apertures, the ends each including an annular groove formed therein, two catches slidably engaged in the rooms respectively and each including a knob extended outward through the block, the catches each including a puncture for receiving the ends and each including a key means for engaging with the annular groove of the ends so as to lock the ends in place, means for biasing the knobs of the catches outward beyond the block, the catches each including a depression formed therein, two pins slidably engaged in the block and extendible inwards of the holes and the rooms, means for biasing the pins toward the holes, the pins being forced toward the catches to engage with the depressions of the catches so as to lock the catches when the shackle is engaged in the holes.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
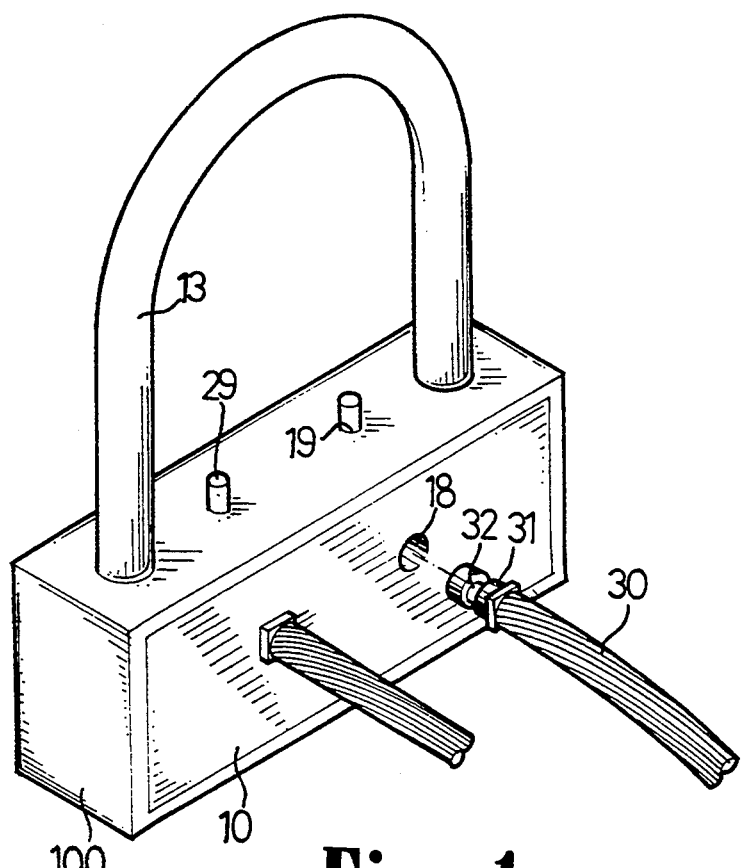
FIG. 1 is a perspective view of a lock assembly in accordance with the present invention.
Figure 2:
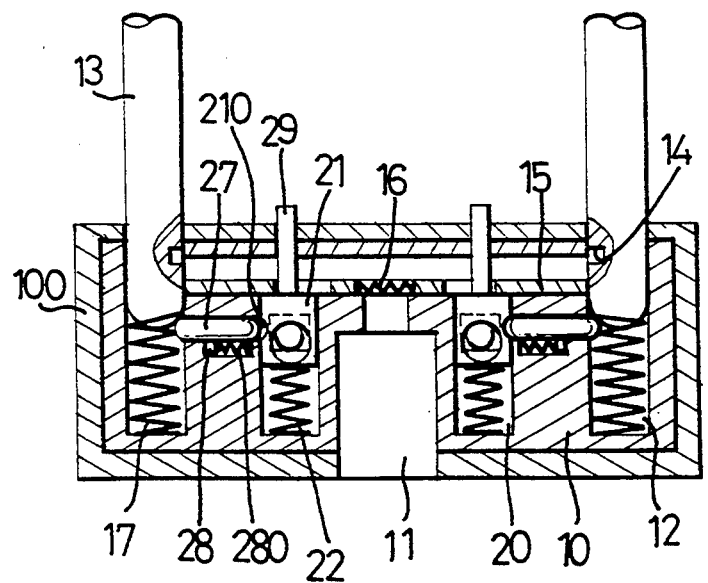
FIG. 2 is a cross sectional view of the lock assembly.
Figure 3:
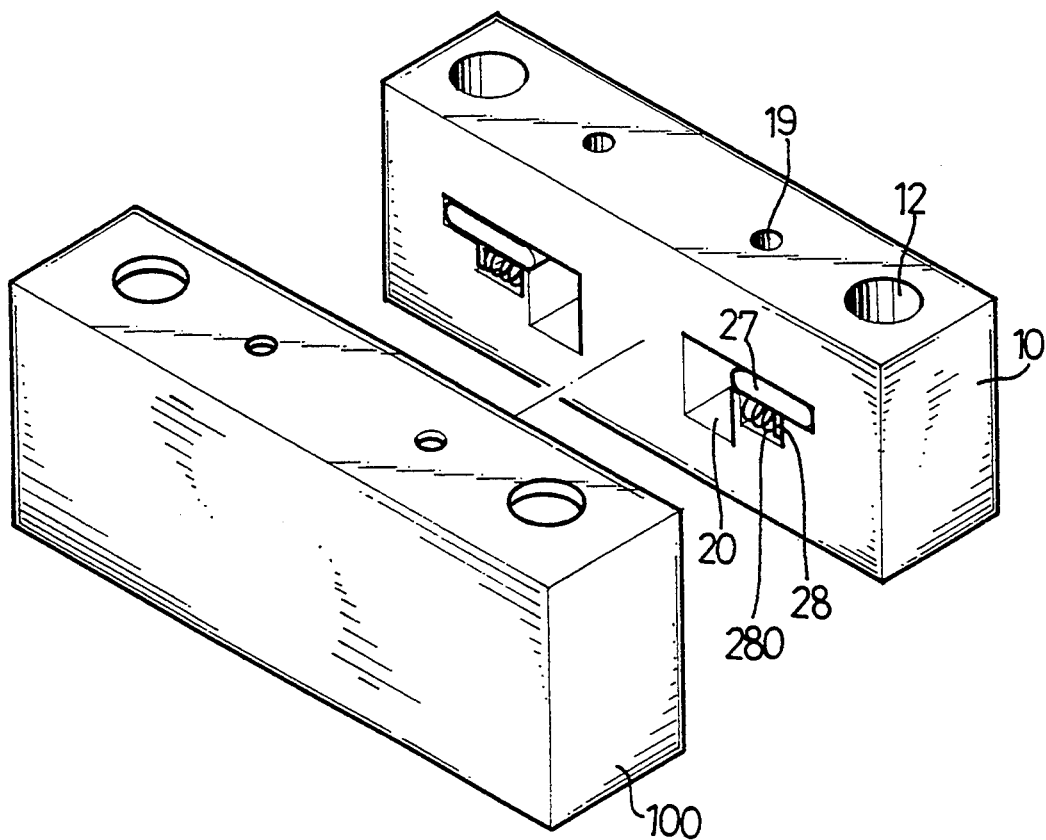
FIG. 3 is a partial exploded view of the lock assembly.

Referring to the drawings, and initially to FIGS. 1 to 3, a lock assembly in accordance with the present invention comprises a block 10 engaged in a housing 100 and including an opening 11 formed therein for receiving a typical lock body (not shown), both the block 10 and the housing 100 include two holes 12 formed therein for engaging with a shackle 13, the shackle 13 includes two cavities 14 formed therein. A pair of latches 15 are slidably disposed in the block 10, and a spring 16 is disposed between the latches 15 for biasing the latches 15 to engage with the cavities 14 of the shackle 13. Two springs 17 are disposed in the holes 12 for biasing the shackle 13 upward. The latches 15 can be disengaged from the cavities 14 by the lock body, this structure is conventional and will not be described in further details.

Figure 5:
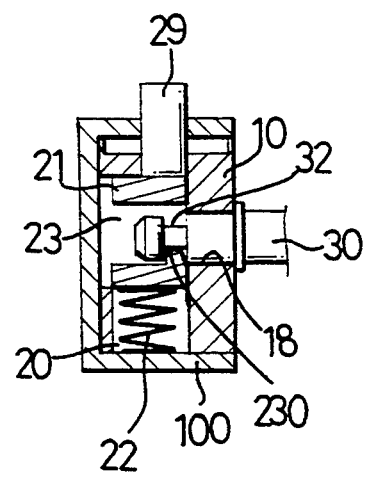
FIG. 5 is a cross sectional view taken along lines 5—5 of FIG. 4.

Two rooms 20 are formed in the block 10, two apertures 18 are formed in the front portion of the block 10 and communicated with the rooms 20, and two orifices 19 are formed in the upper portion of the block 10 and communicated with the rooms 20 respectively. A cable 30 includes two ends 31 for engaging with the apertures 18, each of the ends 31 includes an annular groove 32 formed therein. Two catches 21 are slidably engaged in the rooms 20 respectively and each includes a knob 29 extended upward therefrom for engaging with the orifices 19. Two springs 22 are engaged in the rooms 20 for biasing the catches 21 upward in order to bias the knobs 29 upward beyond the housing 100. As best shown in FIG. 5, each of the catches 21 includes a puncture 23 formed therein for receiving the ends 31 of the cable 30, and a key 230 extends inward from each of the punctures 23 for engaging with the annular groove 32 of the ends 31 so as to lock the ends 31 in place.

As best shown in FIG. 2, the catches 21 each includes a depression 210 formed therein. Two pins 27 are slidably engaged in the block 10 and extendible inwards of both the holes 12 and the rooms 20. Each of the pins 27 includes an extension 28 extended therefrom and a spring 280 biasing against the extension 28 for biasing the pins 27 away from the catches 21.

Figure 4:
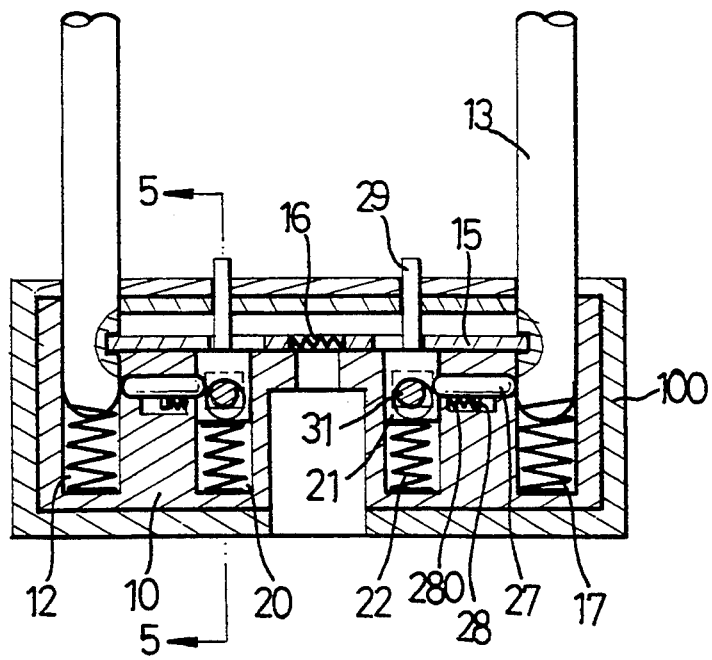
FIG. 4 is a cross sectional view similar to FIG. 2 for illustrating the operation of the lock assembly.

In operation, as shown in FIGS. 2 and 5, the pins 27 are biased away from the catches 21 by the springs 280, and the catches 21 are biased upward to catch the ends 31 of the cable 30 by the springs 22. The annular grooves 32 of the ends 31 of the cable 30 may be engaged with the keys 230 when the ends 31 are inserted into the apertures 18. When the knobs 29 are depressed inwards of the block 10, the keys 230 of the catches 21 may be disengaged from the annular grooves 32 of the cable 30 such that the cable 30 may be disengaged from the lock assembly. However, as shown in FIG. 4, when the shackle 13 is engaged in the holes 12, the pins 27 are forced toward the catches 21 against the springs 280 by the shackle 13, such that the pins 27 are caused to engage with the depressions 210 of the catches 21, the catches 21 are thus locked in place when the shackle 13 is engaged in place.

Accordingly, the lock assembly in accordance with the present invention includes a shackle 13 that may be provided to lock the bicycle itself, and a cable 30 that may secure the bicycle to another object, such as a frame, a tree, a motorcycle or other object.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A lock assembly comprising a block including two holes and two rooms formed therein, two apertures formed in said block and communicated with said rooms, a shackle for engaging with said holes of said block and including two cavities formed therein, a pair of latches slidably disposed in said block, means for biasing said latches to engage with said cavities of said shackle so as to lock said shackle in said holes, a cable including two ends for engaging with said apertures, said ends each including an annular groove formed therein, two catches slidably engaged in said rooms respectively and each including a knob extended outward through said block, said catches each including a puncture for receiving said ends and each including a key means for engaging with said annular groove of said ends so as to lock said ends in place, means for biasing said knobs of said catches outward beyond said block, said catches each including a depression formed therein, two pins slidably engaged in said block and extendible inwards of said holes and said rooms, means for biasing said pins toward said holes, said pins being forced toward said catches to engage with said depressions of said catches so as to lock said catches when said shackle is engaged in said holes.

* * * * *